US007644666B2

(12) United States Patent
Smyers

(10) Patent No.: US 7,644,666 B2
(45) Date of Patent: Jan. 12, 2010

(54) PALLET

(75) Inventor: Justin M. Smyers, San Luis Obispo, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 0 days.

(21) Appl. No.: 11/351,293

(22) Filed: Feb. 9, 2006

(65) Prior Publication Data

US 2007/0181045 A1 Aug. 9, 2007

(51) Int. Cl.
*B65D 19/38* (2006.01)

(52) U.S. Cl. .................. 108/57.28; 108/57.29; 108/901

(58) Field of Classification Search ................ 108/53.1, 108/53.3, 57.18, 57.17, 57.25, 57.28, 57.29, 108/901
See application file for complete search history.

(56) References Cited

U.S. PATENT DOCUMENTS

| | | | |
|---|---|---|---|
| 2,773,691 A | 12/1956 | Redfield | |
| 3,000,633 A | 9/1961 | Bonovich | |
| 3,481,285 A * | 12/1969 | Yellin ...................... | 108/57.28 |
| 3,526,195 A | 9/1970 | Maryonovich | |
| 3,640,229 A * | 2/1972 | Bell ......................... | 108/57.28 |
| 3,641,949 A | 2/1972 | Monk | |
| 3,709,162 A | 1/1973 | Roper | |
| 3,938,448 A | 2/1976 | Nishitani et al. | |
| 4,199,164 A | 4/1980 | Sjoblom | |
| 4,263,855 A | 4/1981 | Lawlor | |
| 4,383,685 A | 5/1983 | Bishop | |
| 4,397,247 A * | 8/1983 | Lemelson .................. | 108/57.1 |
| 4,413,737 A | 11/1983 | Wind | |
| 4,428,306 A * | 1/1984 | Dresen et al. .............. | 108/53.3 |
| 4,480,748 A | 11/1984 | Wind | |
| 4,579,341 A | 4/1986 | Furr | |
| 4,606,278 A * | 8/1986 | Shuert ..................... | 108/57.27 |
| 4,619,207 A | 10/1986 | Boyce et al. | |
| RE32,344 E | 2/1987 | Wind | |
| 4,838,176 A | 6/1989 | Bowser, Sr. et al. | |
| 4,879,956 A | 11/1989 | Shuert | |
| 4,984,789 A | 1/1991 | Socci | |
| 5,046,434 A * | 9/1991 | Breezer et al. ........... | 108/57.27 |
| 5,154,416 A | 10/1992 | Smull et al. | |
| 5,329,861 A | 7/1994 | McCarthy | |
| 5,407,632 A | 4/1995 | Constantino et al. | |
| 5,408,937 A * | 4/1995 | Knight, IV et al. ......... | 108/55.5 |
| 5,413,224 A | 5/1995 | Marron et al. | |
| 5,527,585 A | 6/1996 | Needham et al. | |
| 5,566,624 A | 10/1996 | Brown et al. | |
| 5,606,921 A | 3/1997 | Elder et al. | |
| 5,638,760 A | 6/1997 | Jordan et al. | |
| 5,647,284 A | 7/1997 | Frysinger et al. | |
| 5,658,203 A | 8/1997 | Shub | |

(Continued)

FOREIGN PATENT DOCUMENTS

DE 2 043 832 11/1971

(Continued)

*Primary Examiner*—Hanh V Tran
(74) *Attorney, Agent, or Firm*—Carlson, Gaskey & Olds

(57) ABSTRACT

A pallet includes parallel channels or corrugations in an upper surface of the deck. Perpendicular lower channels or corrugations are formed on a lower surface of the deck. The upper and lower channels or corrugations support one another and provide increased stiffness to the deck. The pallet is designed such that it can be rotomolded.

20 Claims, 16 Drawing Sheets

U.S. PATENT DOCUMENTS

| | | | |
|---|---|---|---|
| 5,667,065 A * | 9/1997 | Fahrion | 206/599 |
| 5,669,315 A | 9/1997 | Model | |
| 5,687,652 A | 11/1997 | Ruma | |
| 5,702,034 A | 12/1997 | Semenenko | |
| D388,931 S | 1/1998 | Constantino et al. | |
| 5,713,289 A | 2/1998 | Model | |
| 5,730,067 A | 3/1998 | Kohlhaas | |
| 5,736,221 A | 4/1998 | Hardigg et al. | |
| 5,755,162 A | 5/1998 | Knight et al. | |
| 5,758,855 A | 6/1998 | Jordan et al. | |
| 5,769,001 A | 6/1998 | Viessmann | |
| 5,791,262 A * | 8/1998 | Knight et al. | 108/57.25 |
| 5,806,436 A | 9/1998 | Weichenrieder, Sr. et al. | |
| 5,813,355 A * | 9/1998 | Brown et al. | 108/53.3 |
| 5,819,941 A | 10/1998 | Vanwingerden | |
| D400,682 S | 11/1998 | Constantino et al. | |
| 5,829,361 A | 11/1998 | Fenton | |
| 5,921,188 A | 7/1999 | Kohlhaas | |
| 5,941,178 A | 8/1999 | Kohlhaas | |
| 5,950,545 A | 9/1999 | Shuert | |
| 5,960,720 A | 10/1999 | Borland et al. | |
| 5,964,162 A | 10/1999 | Chuan-Jen | |
| 5,967,057 A | 10/1999 | Nakayama et al. | |
| D417,539 S | 12/1999 | Koskinen | |
| 5,996,508 A | 12/1999 | Constantino et al. | |
| 6,018,927 A * | 2/2000 | Major | 52/793.1 |
| 6,095,936 A | 8/2000 | Kirkpatrick et al. | |
| 6,250,234 B1 | 6/2001 | Apps | |
| 6,283,044 B1 | 9/2001 | Apps | |
| 6,289,823 B1 * | 9/2001 | Koefelda et al. | 108/53.3 |
| 6,294,114 B1 | 9/2001 | Muirhead | |
| 6,305,301 B1 | 10/2001 | Piper, Jr. et al. | |
| 6,327,984 B1 | 12/2001 | McCann et al. | |
| 6,357,366 B1 | 3/2002 | Frankenberg | |
| 6,389,990 B1 | 5/2002 | Apps | |
| 6,622,641 B2 | 9/2003 | Smyers | |
| 6,626,634 B2 | 9/2003 | Hwang et al. | |
| 6,645,093 B2 | 11/2003 | Sheppard | |
| 6,718,888 B2 | 4/2004 | Muirhead | |
| 6,755,755 B2 | 6/2004 | Wah Loh | |
| 6,943,678 B2 | 9/2005 | Muirhead | |
| 2001/0029874 A1 | 10/2001 | Muirhead | |

FOREIGN PATENT DOCUMENTS

| | | | |
|---|---|---|---|
| DE | 32 05910 | | 2/1982 |
| EP | 0 849 184 | | 6/1998 |
| EP | 1 024 089 A2 | | 8/2000 |
| FR | 1 449 377 | | 8/1966 |
| FR | 2 206 248 | | 6/1974 |
| FR | 2 610 598 | | 2/1987 |
| FR | 2 610 598 | | 8/1988 |
| GB | 1320804 A | * | 6/1973 |
| JP | 53 058581 | | 5/1979 |
| JP | 4114859 | | 4/1992 |
| NL | 9002386 | | 6/1991 |
| WO | 03/051726 | | 6/2003 |

* cited by examiner

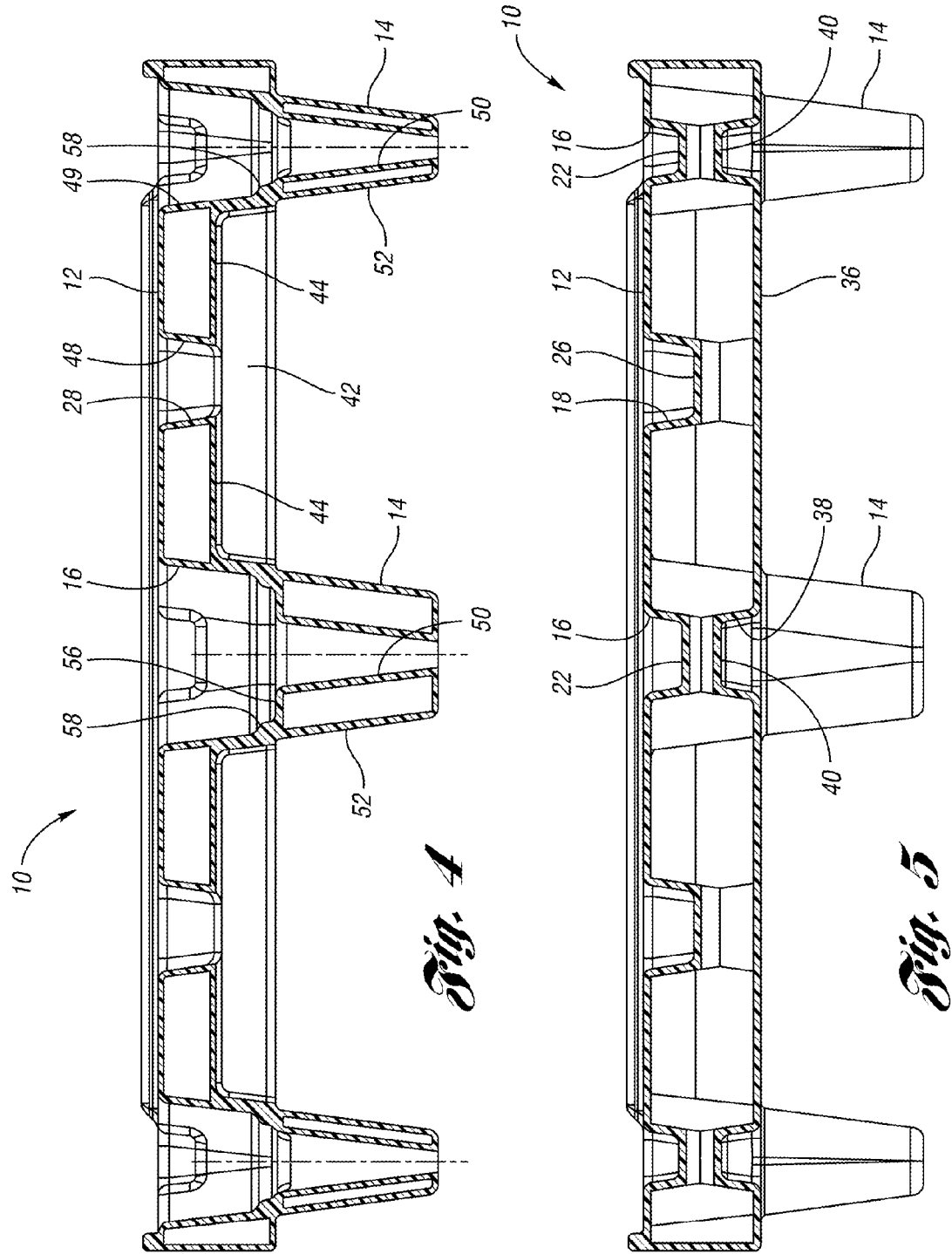

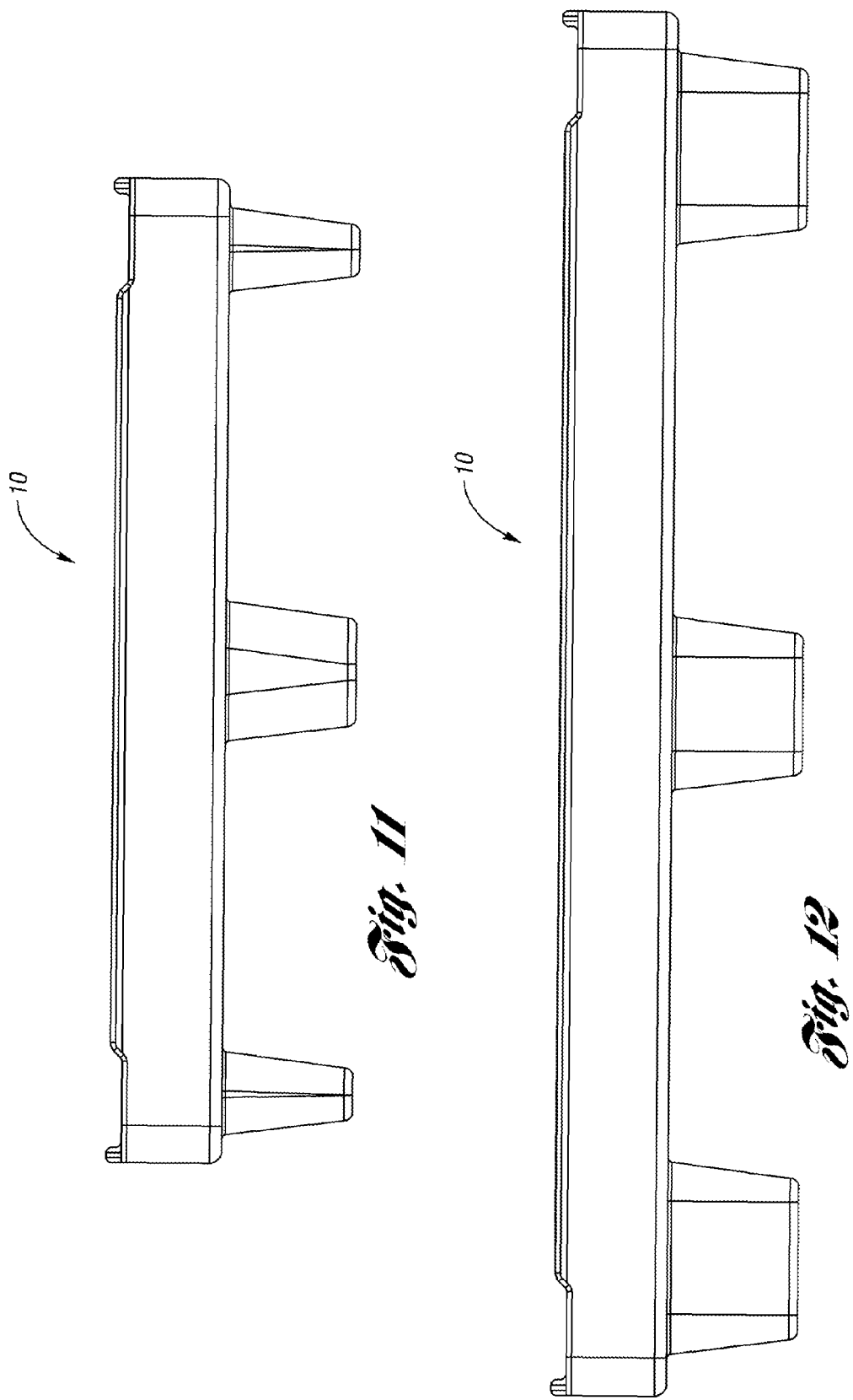

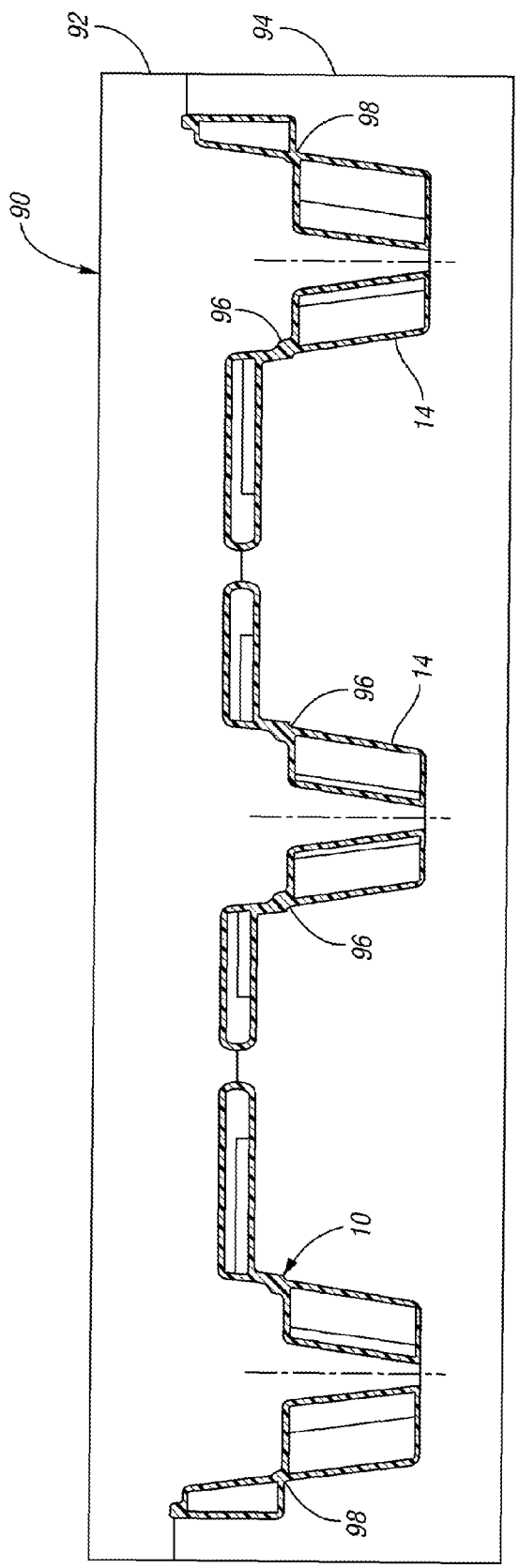

PALLET

BACKGROUND OF THE INVENTION

The present invention relates to pallet and more particularly to a rotomolded plastic pallet.

Pallets are often used to store and transport goods. Pallets maintain the goods at a distance above the floor such that they can be lifted and moved by a forklift. Plastic pallets are lighter and more durable than wooden pallets. However, molds for making injection molded pallets are expensive. Some pallets have been manufactured using rotomolding or rotationally molded. Rotomolding molds are less expensive. However, due to design limitations imposed by the rotomolding technique, the rotomolded pallets have been less sturdy and less functional than some injection molded pallets.

SUMMARY OF THE INVENTION

A pallet includes a deck having a plurality of parallel channels or corrugations in an upper surface of the deck. A plurality of perpendicular lower channels or corrugations are formed on a lower surface of the deck. The upper and lower channels or corrugations support one another and provide increased stiffness to the deck.

The pallet is designed such that it can be rotomolded, yet provides improved strength and stiffness. Additionally, the feet of the pallet partially nest with feet of an empty like pallet when stacked thereon. This reduces stacking height when empty. Ledges formed in at least some of the feet prevent the feet of the upper pallet from becoming wedged within feet of the lower pallet.

BRIEF DESCRIPTION OF THE DRAWINGS

Other advantages of the present invention can be understood by reference to the following detailed description when considered in connection with the accompanying drawings wherein:

FIG. 4 is a section view taken along line 4-4 of FIG. 2.

FIG. 5 is a section view taken along line 5-5 of FIG. 2.

FIG. 11 is a side view of the pallet of FIG. 1.

FIG. 12 is a front view of the pallet of FIG. 1.

FIG. 18 is a section view similar to FIG. 6 of the pallet of FIG. 1 while it is in the rotomolding mold.

DETAILED DESCRIPTION OF THE PREFERRED EMBODIMENT

Figure 1:
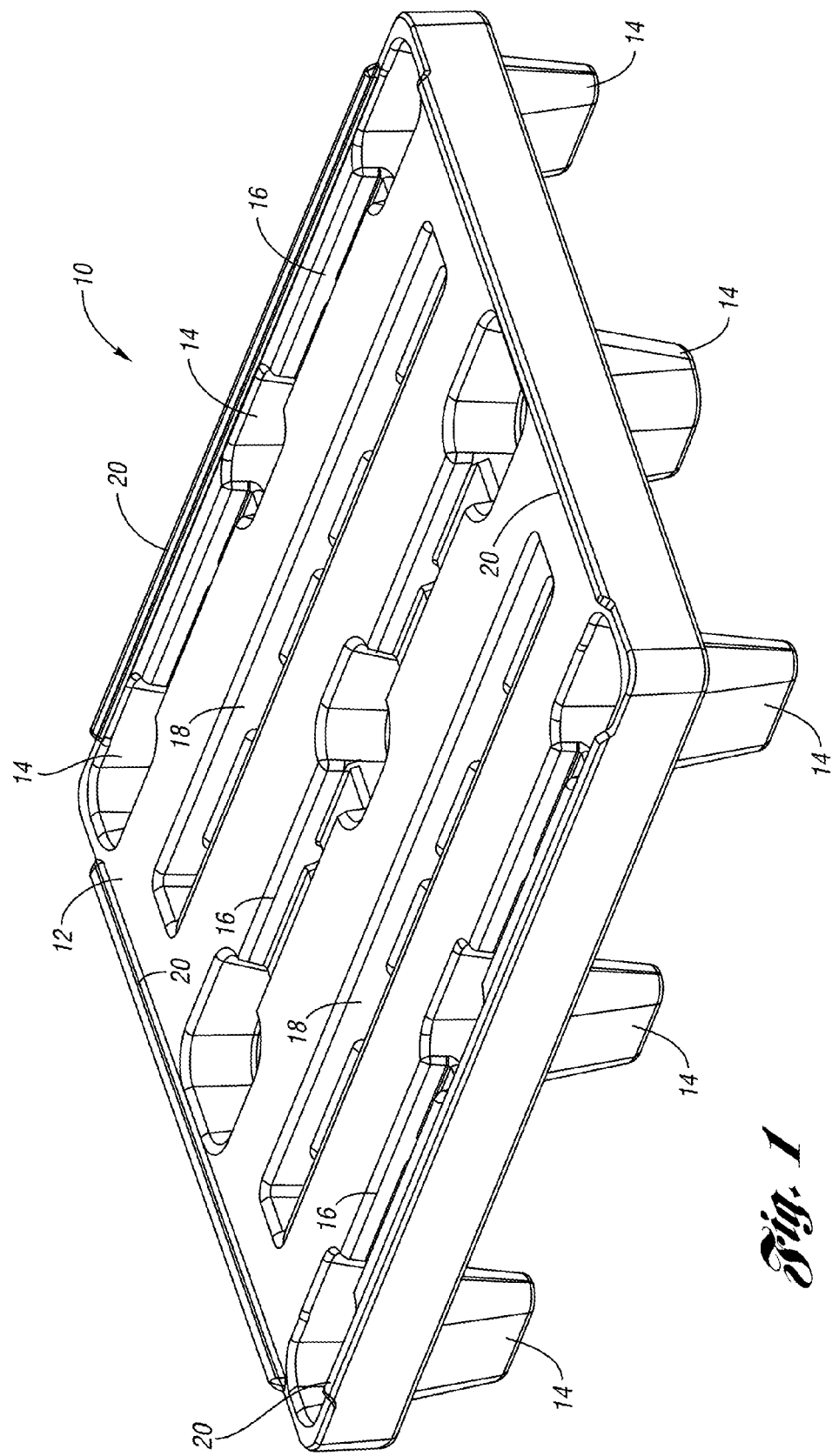
FIG. 1 is a perspective view of a pallet according to the present invention.

A pallet 10 according to the present invention is shown in FIG. 1. The pallet 10 has several inventive features which permit it to be rotomolded while still providing strength, rigidity and nestability. The pallet 10 includes an upper wall 12 of a deck for supporting goods thereon. A plurality of feet 14 extend downwardly to support the upper wall 12 above the floor. Each of the feet 14 is hollow and opens upwardly into one of three parallel contiguous channels 16. Two parallel channels 18 are formed between each adjacent pair of channels 16. The channels 16, 18 provide reinforcement to the upper wall 12 of the pallet 10 in the dimension across which they extend. A lip 20 may be formed along the side, front and rear edges of the upper wall 12 to assist in maintaining goods on the pallet 10.

Figure 2:
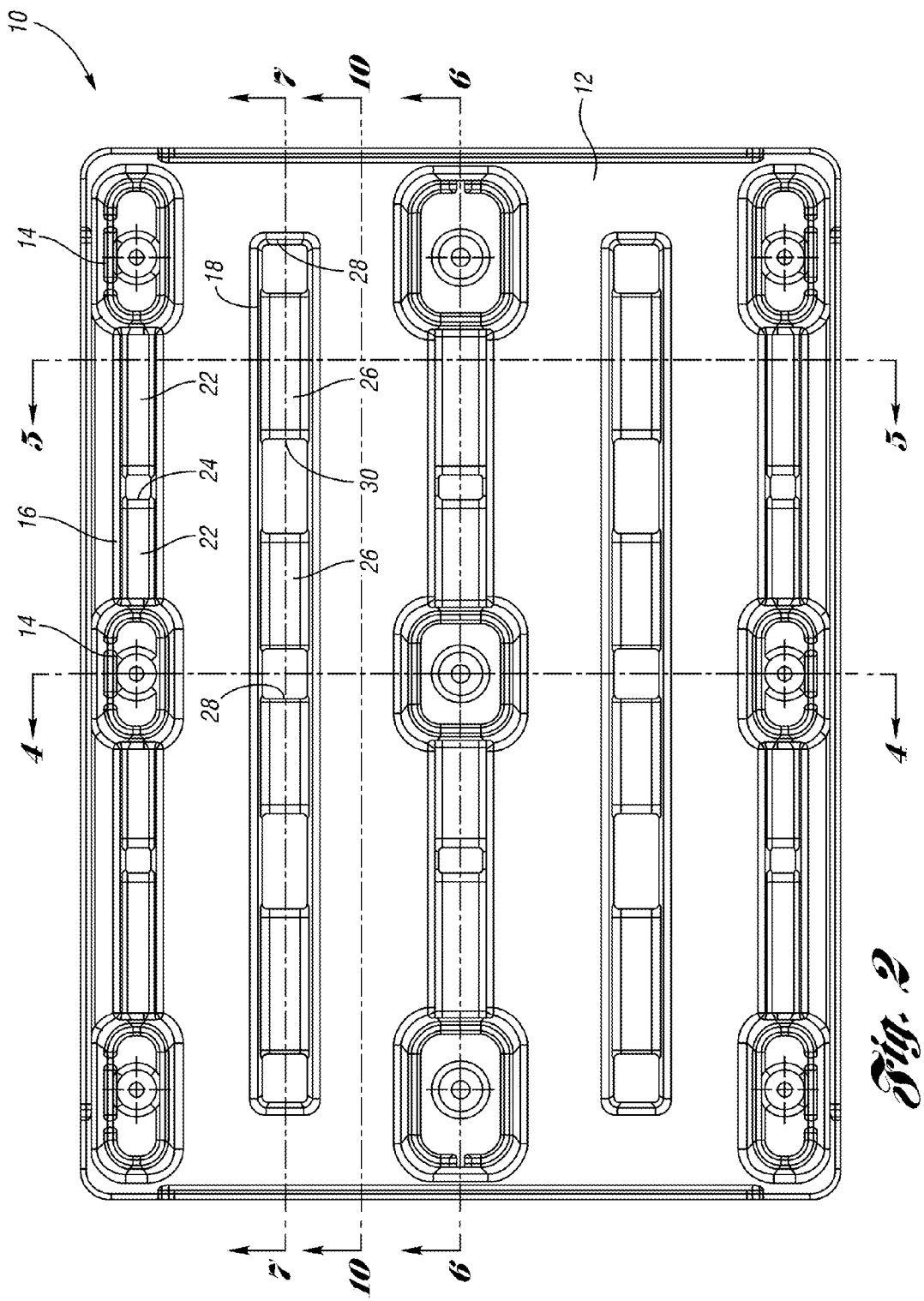
FIG. 2 is a top view of the pallet in FIG. 1.

FIG. 2 is a top view of the pallet 10. Each of the channels 16 includes a pair of lower walls 22 separated by a hole 24 between each adjacent pair of feet 14. Each channel 18 also includes a plurality of lower walls 26 separated by holes 28, 30.

Figure 3:
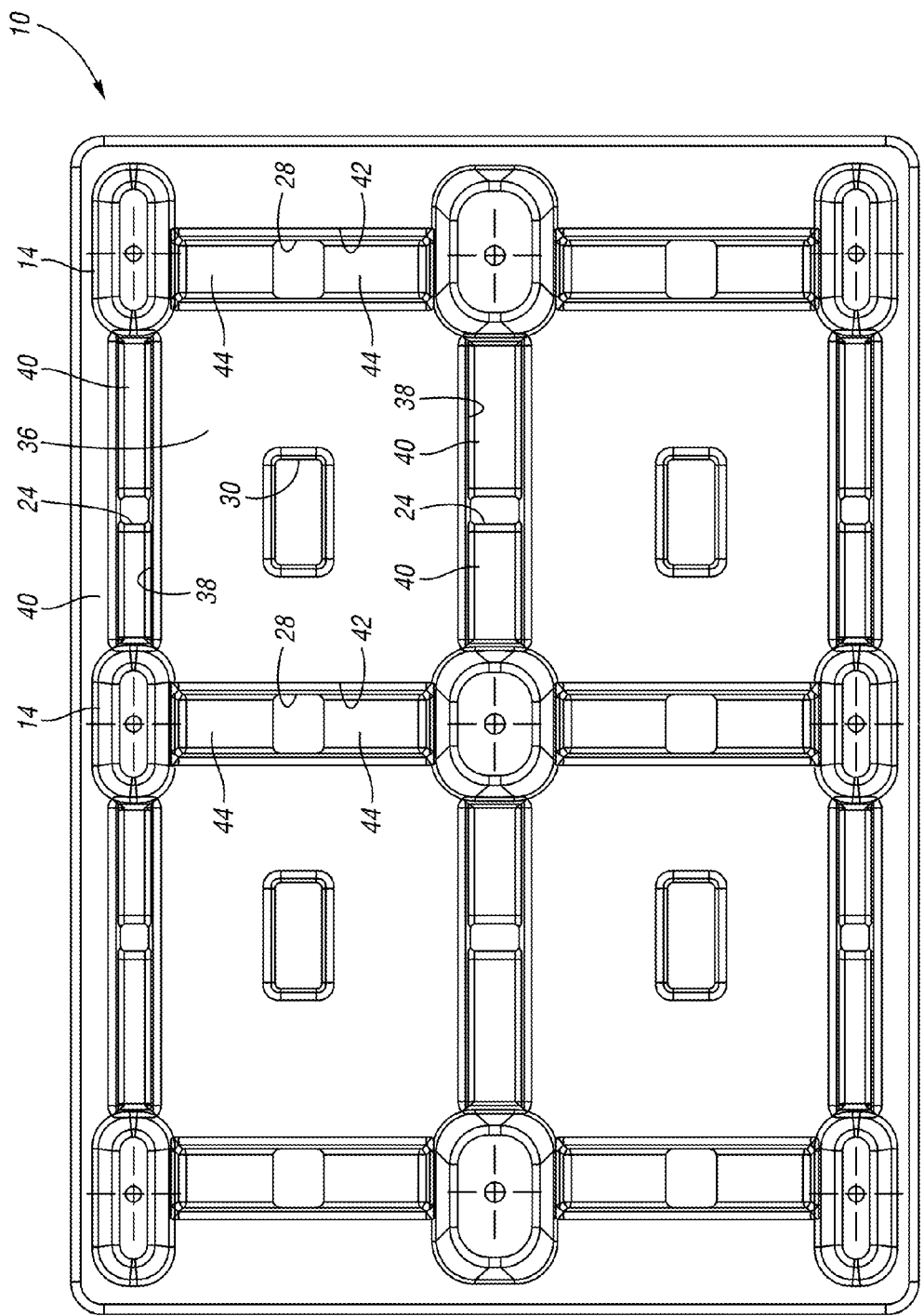
FIG. 3 is a bottom view of the pallet of FIG. 1.

FIG. 3 is a bottom view of the pallet 10. The pallet 10 further includes a lower wall 36 of the deck of the pallet 10. As shown, the holes 24, 28, 30 extend all the way through the deck of the pallet 10. This provides drainage for the pallet 10 and also provides increased support, since the vertical walls adjacent each of the holes 24, 28, 30 interconnects horizontal support structures. As shown in FIG. 3, lower parallel channels 38 are formed on the underside of the pallet 10, aligned with the upper channels 16 (FIG. 2). The lower channels 38 each include horizontal walls 40 which are spaced apart from the lower walls 22 of the upper parallel channels (FIG. 2). The underside of the pallet 10 further includes perpendicular lower channels 42 having upper walls 44 spaced apart by holes 28 and spaced below the upper wall 12 (FIG. 2) of the pallet 10. The perpendicular lower channels 48 extend between each adjacent pair of feet 14.

FIG. 4 is a section view taken along line 4-4 of FIG. 2. As shown, the upper wall 12 together with the upper wall 44 of the perpendicular lower channel 42, the vertical wall portions defining hole 28 and the vertical wall portions 49 defining a pocket above the foot 14 define a box beam section which rigidly supports the upper wall 12 of the pallet 10. Each of the feet 14 includes an oblong tapered outer wall 52 and an oblong tapered inner wall 50 defining an opening at the bottom of each foot 14. At the top of the larger feet 14 (aligned with the middle channel 16) is formed an oblong annular shoulder 56 that connects the outer wall 52 and inner wall 50. An annular portion 58 of increased thickness assists in supplying material to the feet 14 during the rotomolding process.

FIG. 5 is a section view taken along 5-5 of FIG. 2. The channels 16 are generally aligned with and parallel to the lower parallel channels 38. The lower walls 22 of the upper parallel channels 16 are parallel to and spaced above the upper walls 40 of the lower parallel channels 38. The channels 16, 18 and 38 form corrugations which increase the strength and stiffness of the pallet in the dimension across which they extend.

Figure 6:
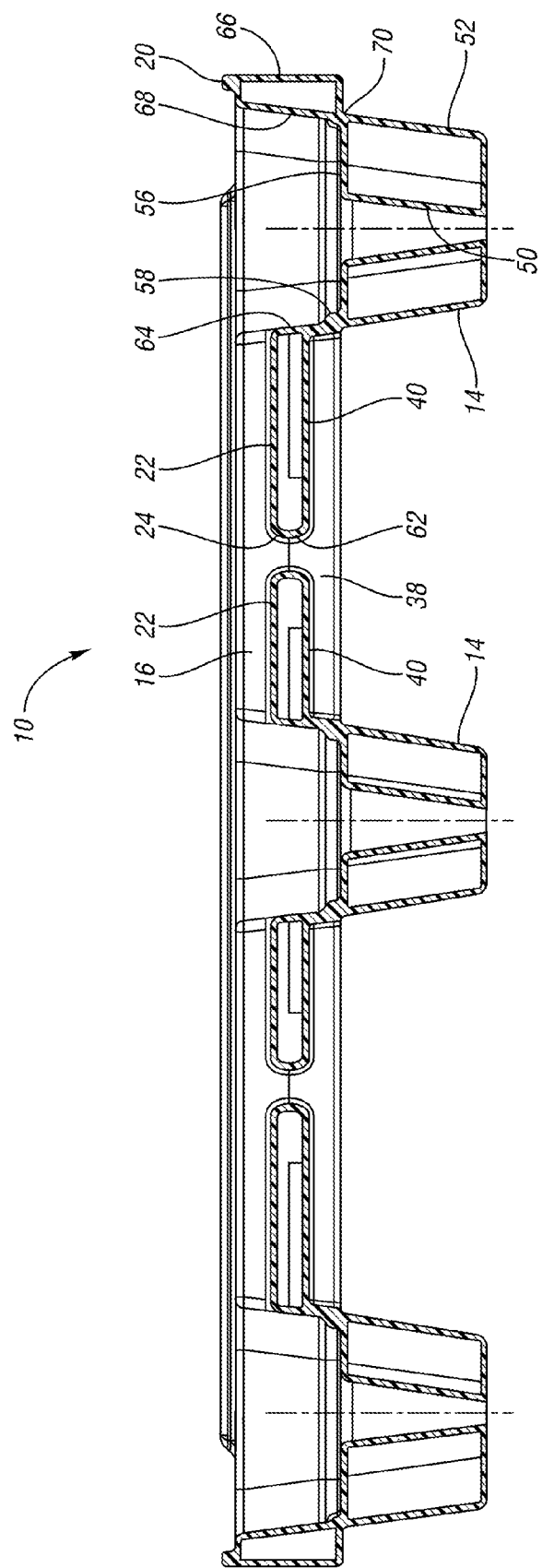
FIG. 6 is a section view taken along line 6-6 of FIG. 2.

FIG. 6 is a section view taken along line 6-6 of FIG. 2. As shown, the lower walls 22 of the channels 16 are parallel to and spaced above the upper walls 40 of the channels 38. The lower walls 22 and upper walls 40 are connected by vertical walls 62 which define the holes 24 through the pallet 10. The lower walls 22 and upper walls 40 are also connected by vertical walls 64 which partially define the pocket above the foot 14. The pocket above foot 14 further includes an outer wall 66 which extends around the perimeter of the pallet 10 and connects to an inner wall 68 at kiss-off area 70. The pocket is further defined by the annular shoulder 56 that connects the inner wall 50 and outer wall 52 of the foot 14.

Figure 7:
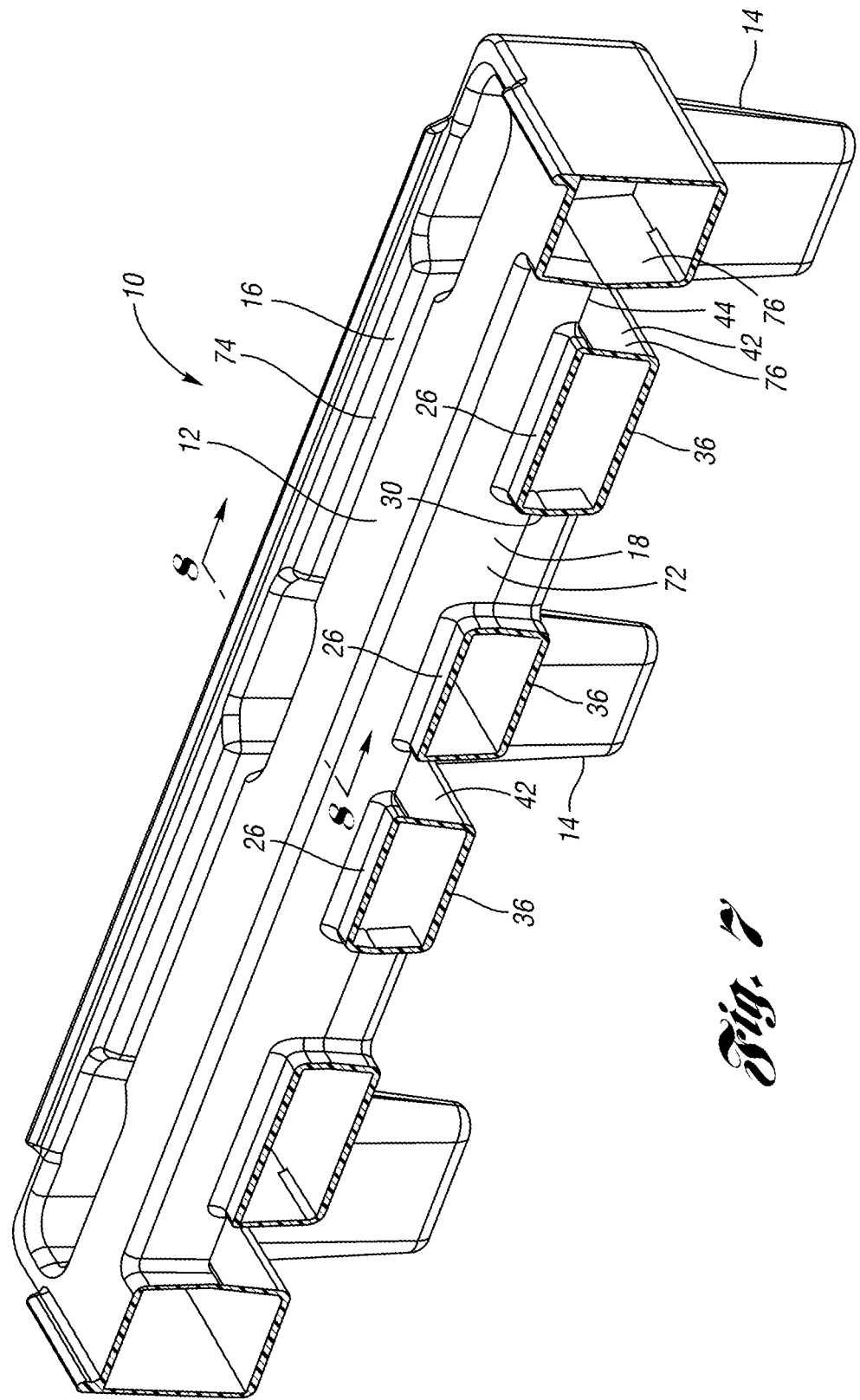
FIG. 7 is a top perspective view of the pallet partially broken away along line 7-7 of FIG. 2.

FIG. 7 is a perspective view of the pallet partially broken away along line 7-7 of FIG. 2. As is shown more clearly in this Figure, the corrugations or channels 16, 18 are supported on top of the perpendicular lower channels 42. In particular, the vertical walls 72, 74 of the channels 18, 16 respectively, are supported by the vertical walls 76 of the perpendicular lower channels 42.

Figure 8:
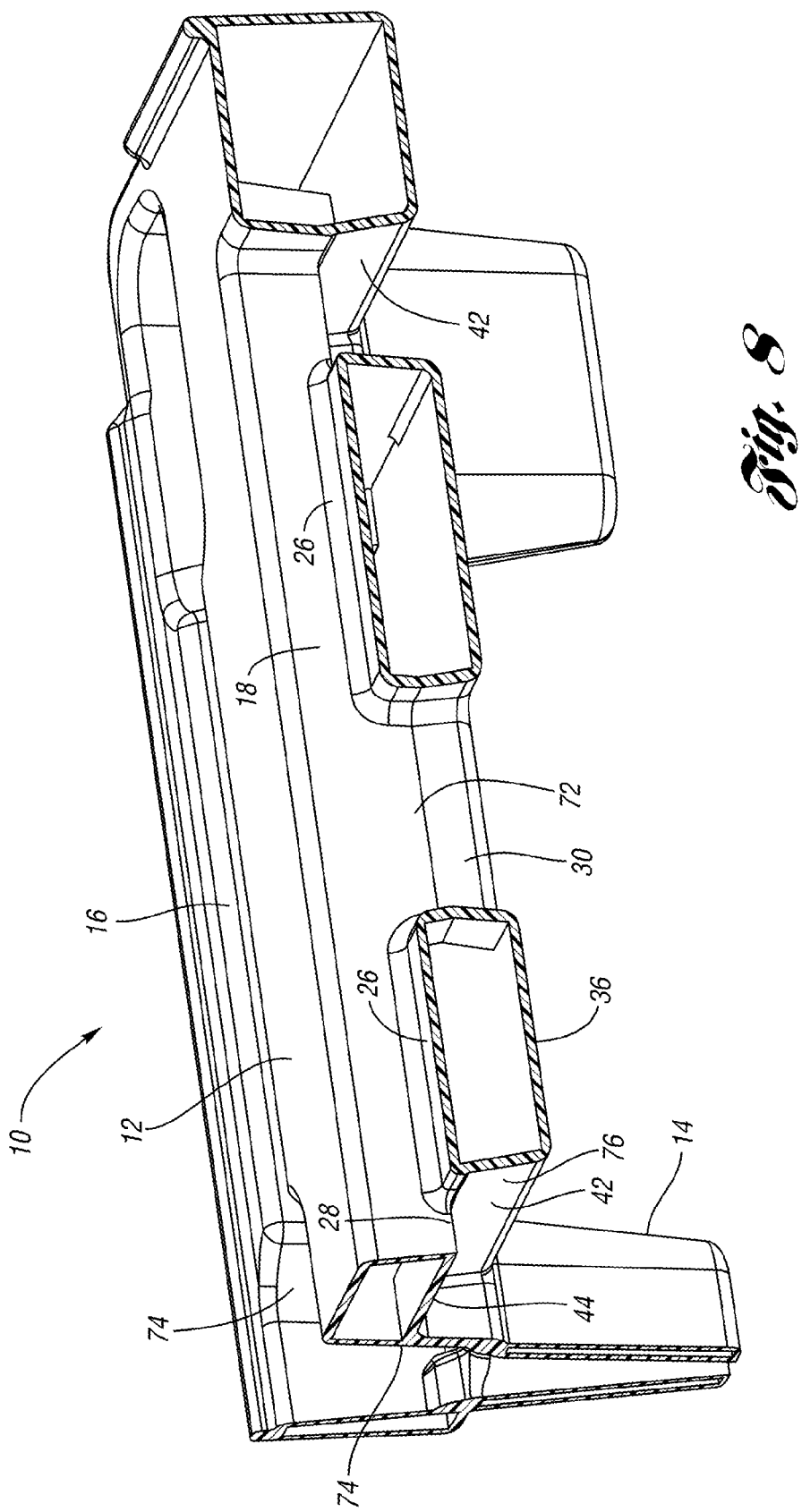
FIG. 8 is another perspective view of the pallet section of FIG. 7, also partially broken away line 8-8 of FIG. 7.
Figure 9:
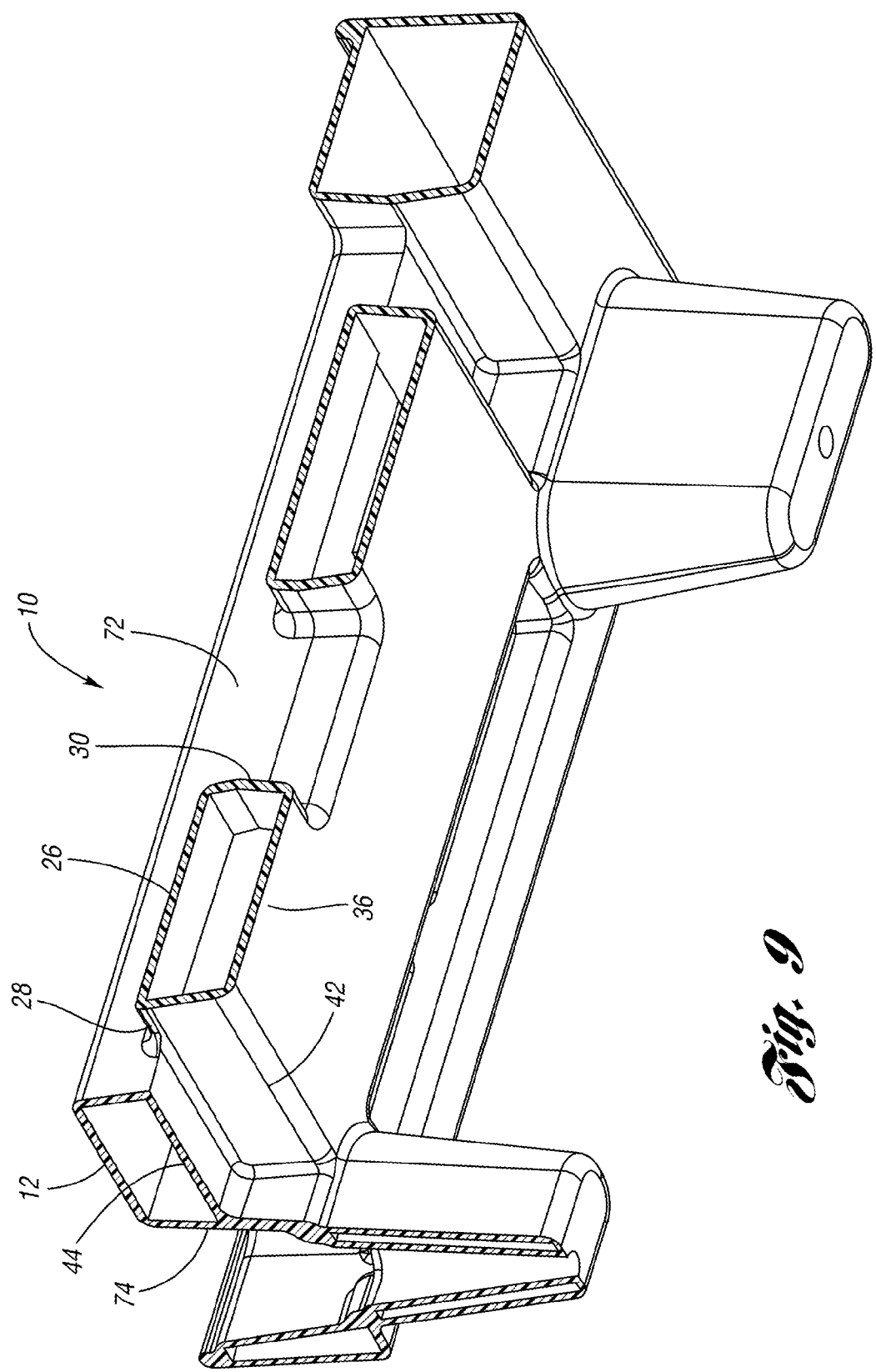
FIG. 9 is a bottom perspective view of the pallet of FIG. 8.

FIG. 8 shows the pallet section of 37 further sectioned along line 8-8 of FIG. 7. This further shows how the parallel upper channels 18 are supported by the perpendicular lower channels 42 and how the box beam sections formed by the upper wall 12 and upper wall 44 of the perpendicular lower channel 42 and connected by vertical walls 74 and 72 are supported by the perpendicular box sections formed by lower wall 26, lower wall 36, vertical wall 76 (defining perpendicular lower channel 42) and the vertical walls defining the walls of opening 30. FIG. 9 is a bottom perspective view of the pallet section of FIG. 8.

Figure 10:
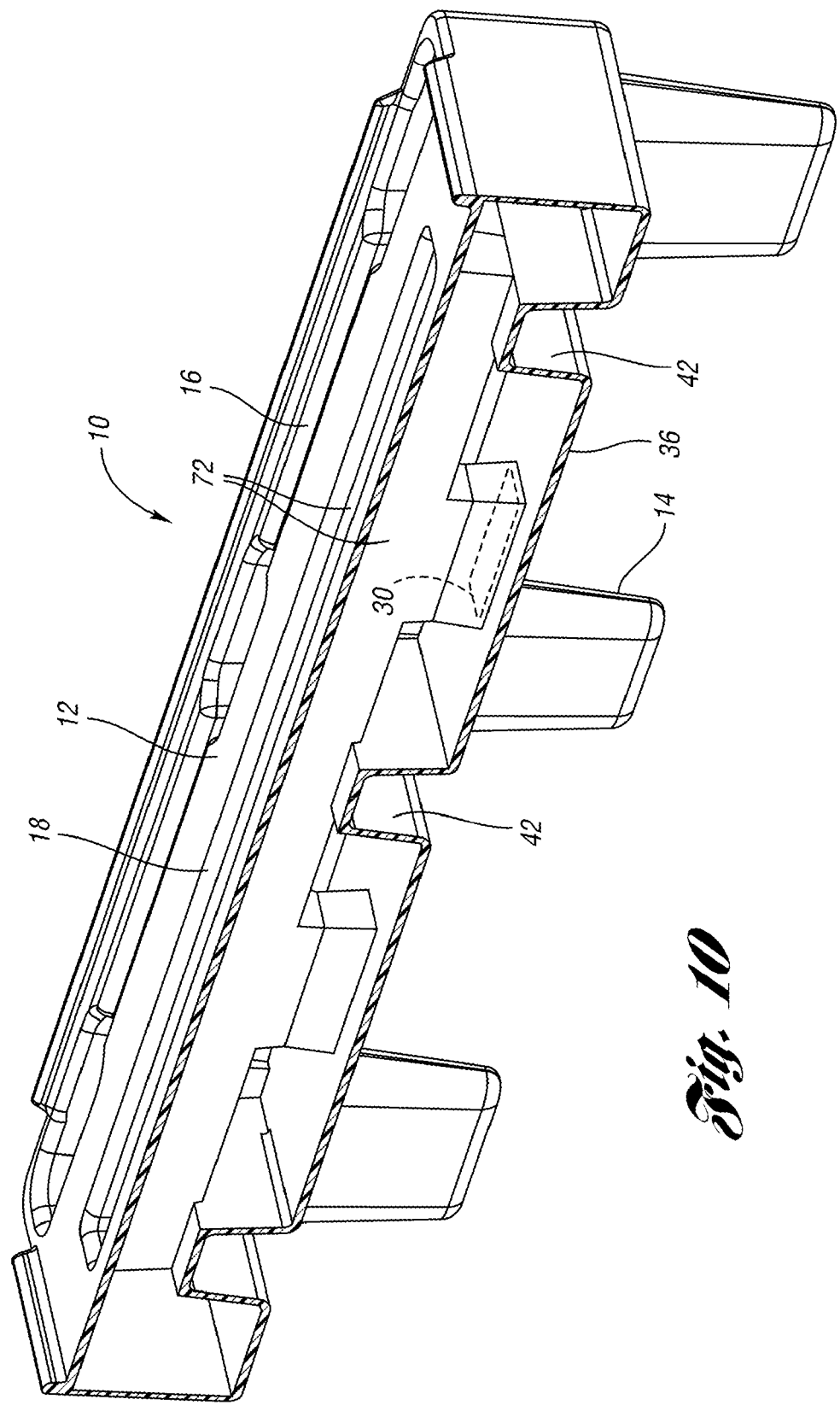
FIG. 10 is a perspective view of the pallet partially broken away along line 10-10 of FIG. 2.

FIG. 10 is a perspective view of the pallet 10 broken away along line 10-10 of FIG. 2. As shown in FIG. 10, the vertical walls defining the opening 30 interconnect the channels 18 to the lower wall 36 to further increase support to the upper wall 12 of the pallet 10 and increase the overall stiffness of the pallet 10.

FIG. 11 is a side view of the pallet 10. FIG. 12 is a front view of the pallet 10.

Figure 13:
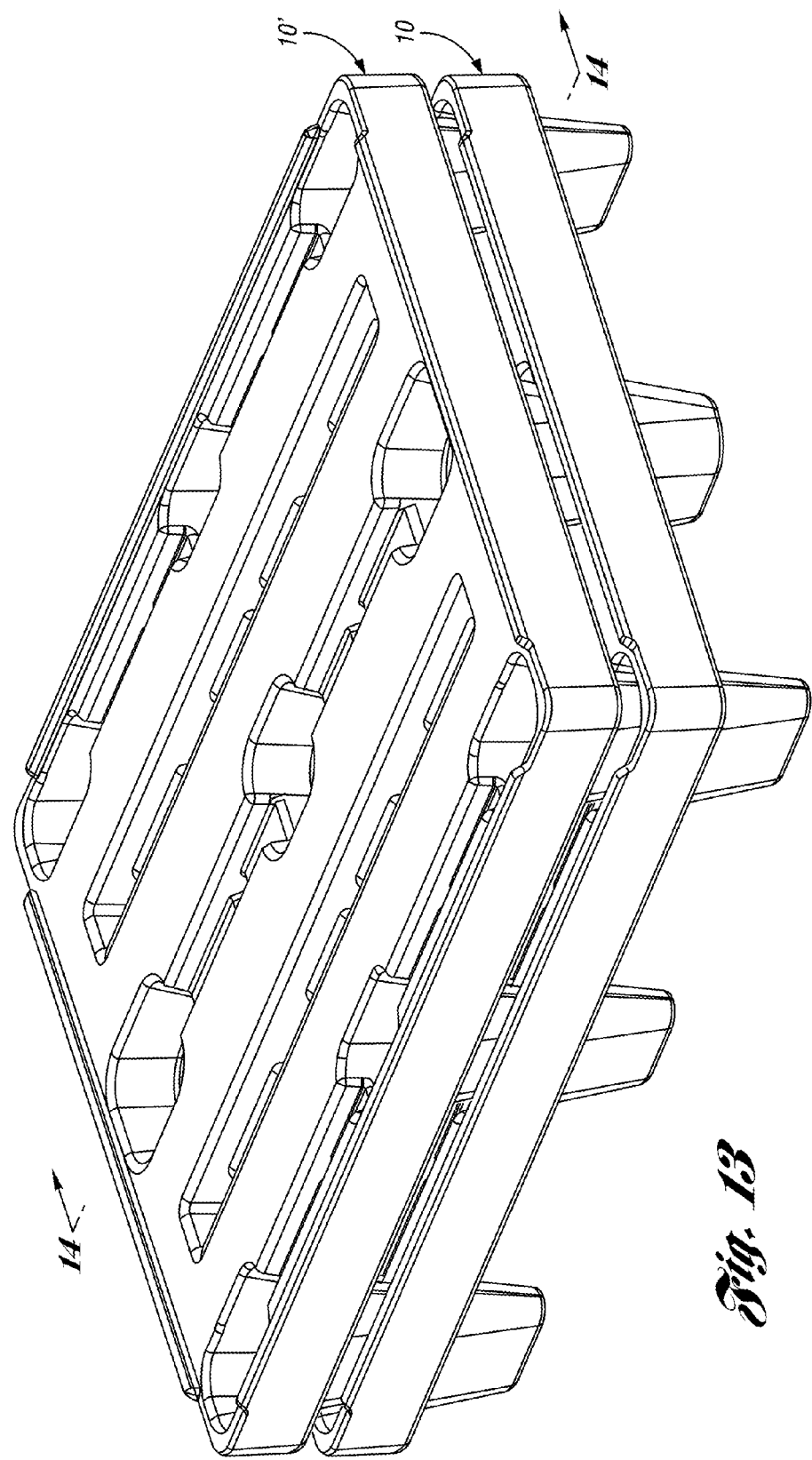
FIG. 13 illustrates the pallet of FIG. 1 with a similar pallet nested therein.
Figure 14:
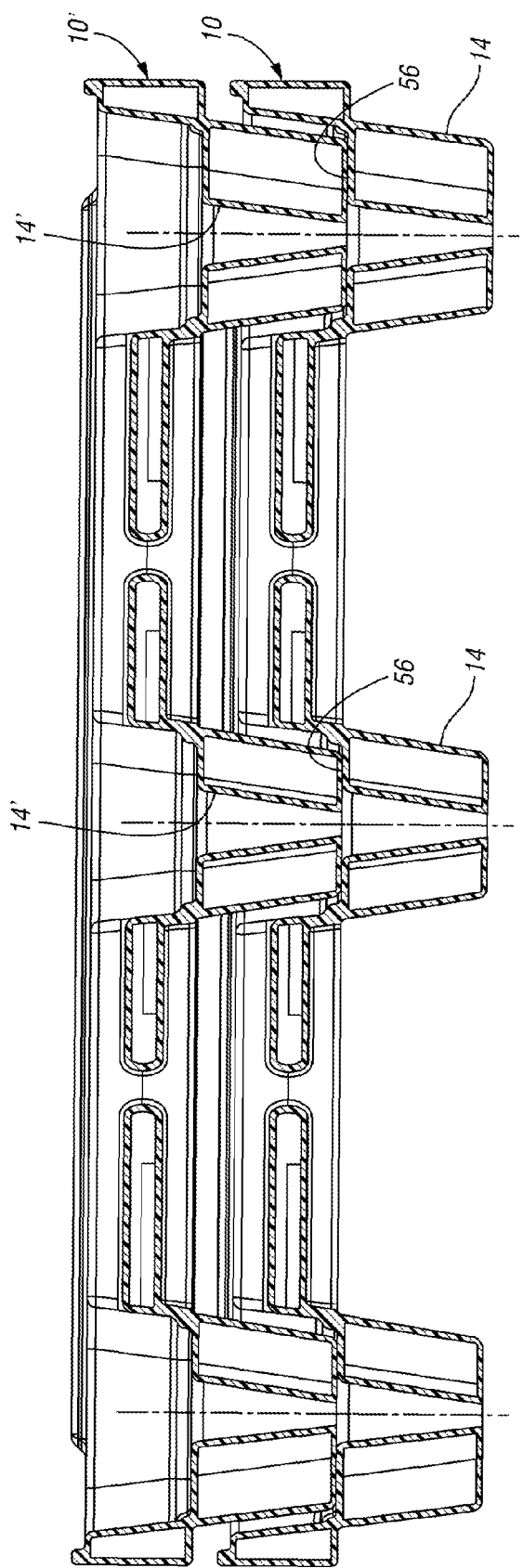
FIG. 14 is a section view through the pallets of FIG. 13 taken along line 14-14.

FIG. 13 illustrates the pallet 10 with a similar pallet 10' nested therein. FIG. 14 is a section taken along line 14-14 of FIG. 13. The feet 14' of the upper pallet 10' are supported on the annular shoulders 56 of the feet 14 in the lower pallet 10. This prevents the feet 14' being wedged inside the feet 14.

Figure 15:
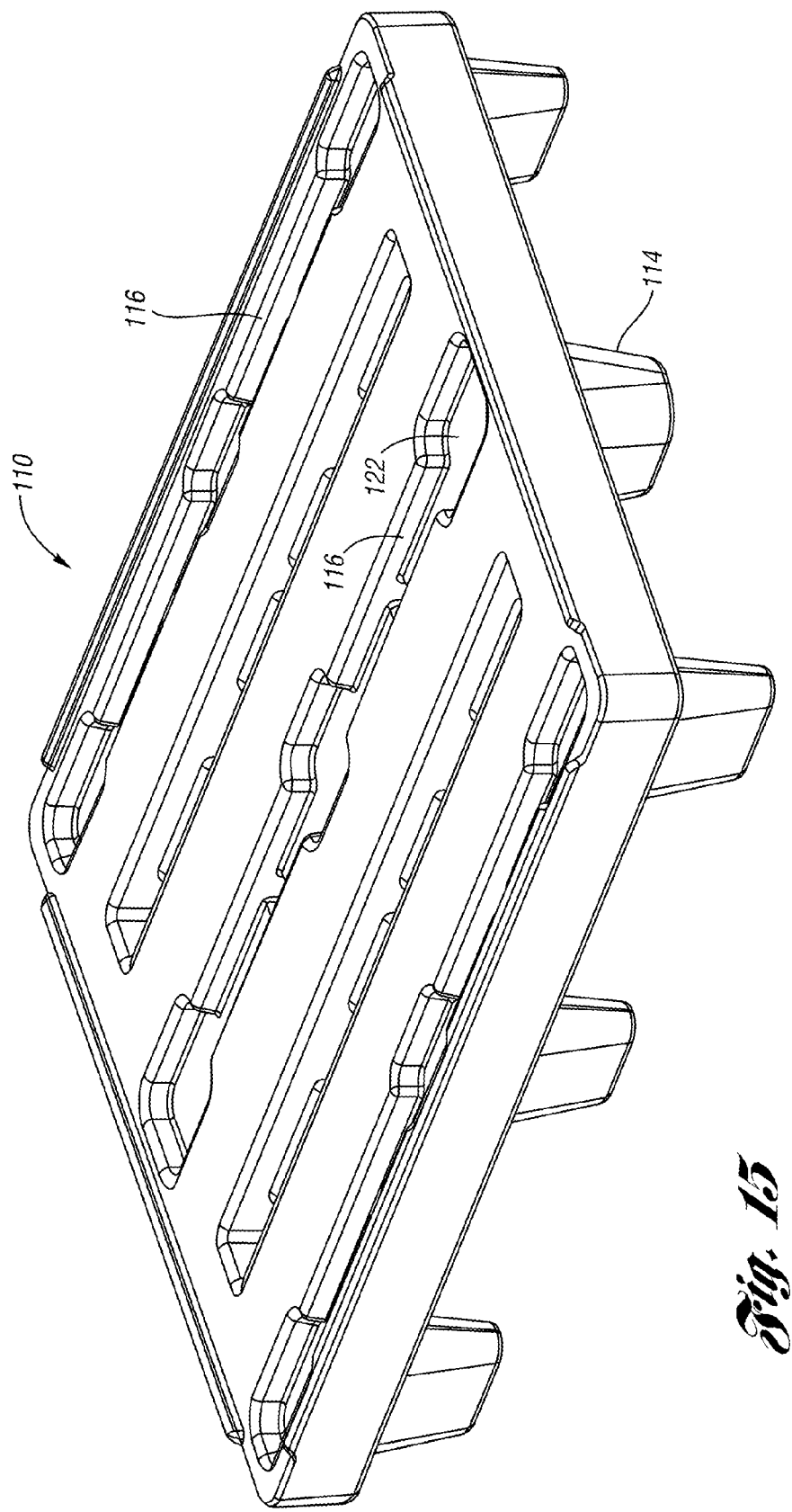
FIG. 15 is a perspective view of an alternate pallet according to the present invention.
Figure 16:
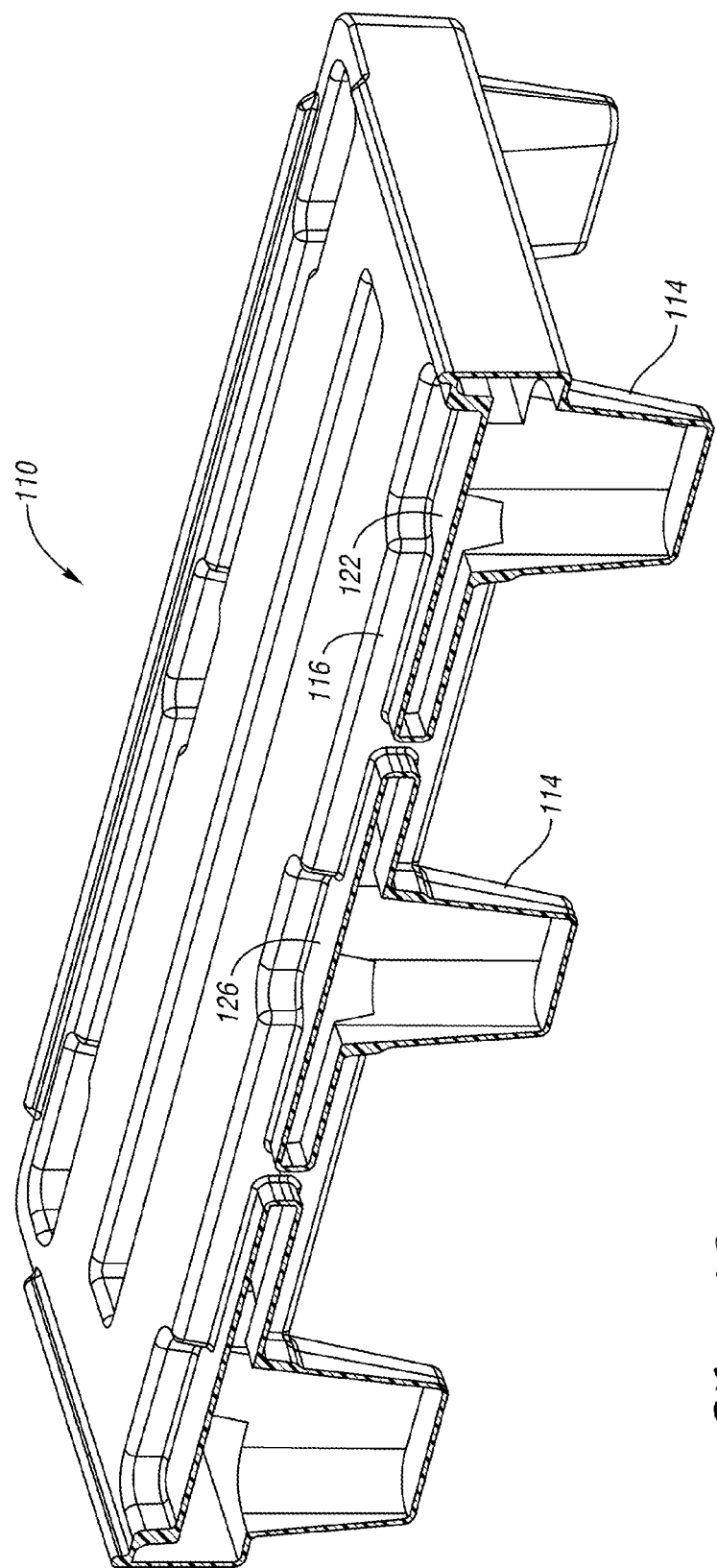
FIG. 16 is a perspective view of the pallet of FIG. 15 partially broken away along line 16-16 of FIG. 15.
Figure 17:
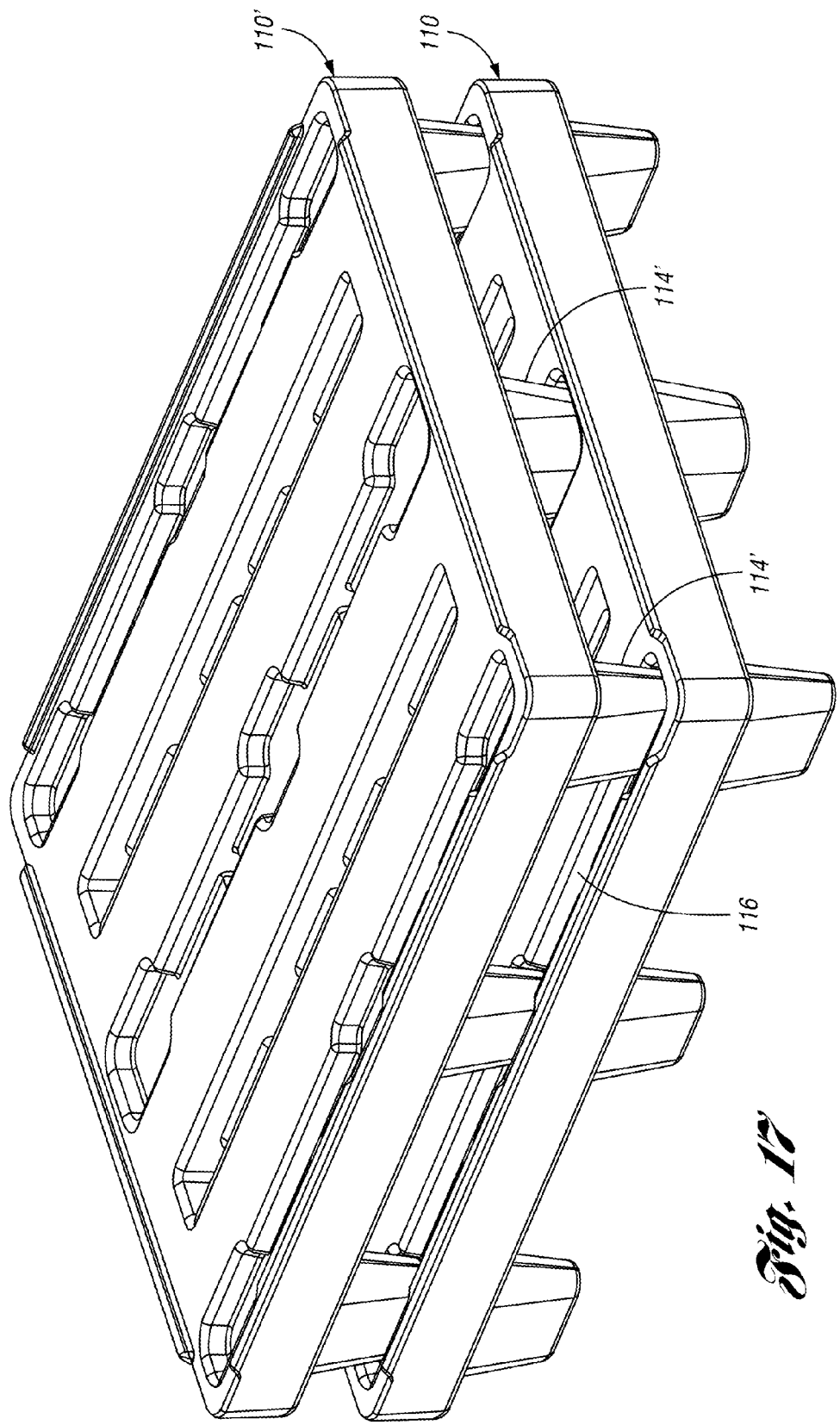
FIG. 17 illustrates the pallet of FIG. 15 with a similar pallet nested therein.

FIG. 15 is a pallet 110 according to a second embodiment. The pallet 110 is generally the same as the pallet 10 of FIG. 1-14 except as otherwise described herein or shown in FIG. 15-17. Corresponding parts of pallet 110 will be given the same reference numerals as in pallet 10 with a "1" preappended. In the pallet 110 the lower walls 122 of the channels 116 extend over the feet 114. This is shown more clearly in the section view of FIG. 16. As shown in FIG. 17, a similar pallet 110' stacked on the pallet 110 will be supported on the lower wall 122. In this manner, the upper pallet 110' is supported higher above the lower pallet 110.

Pallets according to the present invention, including the pallets 10, 110 described above and shown in Figures, are specifically designed to be rotomolded, while still providing increased strength and stiffness and providing a controlled degree of nestability as described above.

FIG. 18 is a section view similar to FIG. 6 through the pallet 10 while the pallet is in a mold 90. The mold 90 includes upper mold 92 and lower mold 94. As shown, the walls of the pallet 10 are formed along surfaces of the upper and lower molds 92, 94. Flow channels 96 are formed with an increased dimension between the upper and lower molds 92, 94 in order to ensure that material is provided to the feet 14. Along the outer perimeter, a narrow kiss-off area 98 is formed to ensure that the mating wall sections connect to one another thereby increasing the strength and stiffness of the pallet 10. As is known, material (such as a polymer) is added to between the upper and lower molds 92, 94. The upper and lower molds 92, 94 are then rotated about one or more axes, causing the material to contact the surfaces of the molds 92, 94. The walls of the pallet 10 are formed wherever the material contacts the walls of the molds 92, 94. In this manner, a pallet 10 with many hollow cavities and box beam sections can be formed for increased support to the pallet 10.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A pallet comprising:
a deck having an upper surface and a lower surface, the lower surface spaced below the upper surface, the upper surface including a plurality of upper channels formed therein, the lower surface including a plurality of lower channels formed therein, the upper channels supported by the lower channels, wherein at least one of the plurality of upper channels includes a lower wall having an opening therethrough, the opening defined by a substantially vertical wall connecting the lower wall to the lower surface of the deck and to the upper surface of the deck;
wherein at least a portion of the lower wall of the at least one of the plurality of upper channels is connected by two lower vertical walls to a bottom wall, such that the lower wall, the two lower vertical walls and the bottom wall form a box section; and
a plurality of feet extending downward from the deck, the deck including a plurality of openings therethrough aligned with and leading into each of the feet.

2. The pallet of claim 1 wherein each of the upper channels opens upwardly.

3. The pallet of claim 2 wherein each of the lower channels opens downwardly.

4. The pallet of claim 1 wherein each of the upper channels extends between an adjacent pair of feet.

5. The pallet of claim 4 wherein each of the lower channels extends between an adjacent pair of feet.

6. The pallet of claim 1 wherein each of the feet includes a tapered inner wall and a tapered outer wall spaced outwardly from the inner wall.

7. The pallet of claim 6 wherein each of the inner walls defines an opening through the bottom of the foot.

8. The pallet of claim 6 wherein at least one of the feet includes an upper shoulder connecting the inner wall to the outer wall.

9. The pallet of claim 1 wherein each of the upper channels includes a pair of spaced apart substantially vertical walls supported on spaced apart substantially vertical walls defining the lower channels.

10. The pallet of claim 1 wherein each of the feet includes a flow channel adjacent one of the channels, the flow channel comprising an area of increased dimension.

11. The pallet of claim 1 wherein at least one of the upper channels is contiguous with more than one of the openings through the deck that are aligned with the feet.

12. The pallet of claim 1 wherein the pallet is rotomoldable.

13. The pallet of claim 1 wherein the plurality of upper channels is a plurality of first upper channels, the pallet further including a plurality of second upper channels generally parallel to the first upper channels and spaced between the first upper channels.

14. A pallet comprising:

a deck having an upper surface and a lower surface, the lower surface spaced below the upper surface, the upper surface including a plurality of upper channels formed therein, the lower surface including a plurality of lower channels formed therein, the upper channels supported by the lower channels, at least one of the plurality of upper channels including a lower wall having an opening therethrough, the opening defined by a substantially vertical wall connecting the lower wall to the lower surface of the deck;

wherein at least a portion of the lower wall of the at least one of the plurality of upper channels is connected by two lower vertical walls to a bottom wall, such that the lower wall, the two lower vertical walls and the bottom wall form a box section; and a plurality of feet extending downward from the deck.

15. The pallet of claim 14 wherein the two lower vertical walls are generally perpendicular to the at least one of the plurality of upper channels.

16. A pallet comprising:

a deck having an upper wall spaced above a lower wall, a plurality of elongated first walls extending downward from the upper wall, a plurality of elongated second walls extending upward from the lower wall to the plurality of first walls, the first walls generally transverse to the second walls, an upper opening through the upper wall, a first horizontal wall aligned with the upper opening and connecting at least two of the plurality of second walls, a deck opening extending through the upper wall, the lower wall, between a pair of the plurality of first walls and between a pair of the plurality of second walls; and a plurality of feet extending downward from the deck.

17. The pallet of claim 16 further including a lower opening through the lower wall, a second horizontal wall aligned with the lower opening and connecting at least two of the plurality of first walls.

18. The pallet of claim 17 wherein the second horizontal wall is spaced downwardly away from the first horizontal wall.

19. The pallet of claim 16 wherein the first horizontal wall is recessed downwardly from the upper wall and connects at least two of the plurality of first walls, and wherein the first horizontal wall, the at least two of the plurality of second walls and the lower wall form a box section.

20. The pallet of claim 19 further including a pair of vertical wall portions separating the first horizontal wall and the second horizontal wall.

* * * * *